Dec. 15, 1970  R. C. BUELER  3,547,498

CONTROL VALVE

Filed Aug. 16, 1966

INVENTOR
RICHARD C. BUELER
BY
Joseph E. Papin.

United States Patent Office 3,547,498
Patented Dec. 15, 1970

3,547,498
CONTROL VALVE
Richard C. Bueler, Glendale, Mo., assignor, by mesne assignments, to Wagner Electric Corporation, Newark, N.J., a corporation of Delaware
Filed Aug. 16, 1966, Ser. No. 572,817
Int. Cl. B60t 8/26, 15/00
U.S. Cl. 303—6
6 Claims

ABSTRACT OF THE DISCLOSURE

A control valve for use in a fluid pressure braking system to control the energization of disc type front brakes. The control valve allows pressure fluid flow to the front brakes until a predetermined pressure is reached and then blocks communication to the front brakes. After a second higher predetermined pressure is reached fluid pressure flow is again permitted to the front brakes.

---

Figure 1:
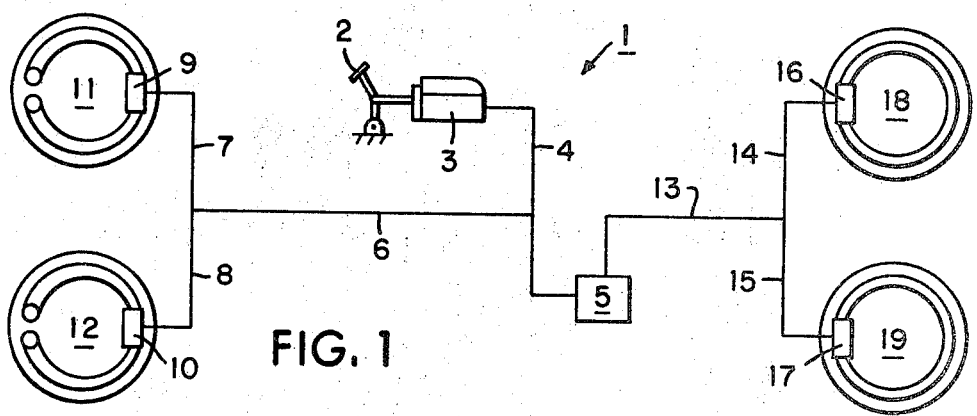

This invention relates to fluid pressure systems and more particularly to a control valve for use in such a fluid pressure system.

In the past, control valves have been provided in vehicle fluid pressure systems having dissimilar axle sets of friction devices to compensate for the different magnitudes of fluid pressure required for initial friction device energization. Such past vehicle fluid pressure systems have either varied fluid pressures at the axle sets of friction devices in a predetermined ratio or have delayed friction device energization at one axle set until initial energization of the other axle set and thereafter provided equal fluid pressure to said friction devices. Still other of these prior art control valves made no provision for bleeding the fluid pressure system at low fluid pressures.

It has been found desirable in certain applications utilizing dissimilar axle sets of friction devices to maintain a constant predetermined difference between the fluid pressures at the axle sets of friction devices for obtaining equal braking effort at said axle sets for a more efficient braking application. For example, in a vehicle fluid pressure system having one axle set of disc type friction devices and the other axle set of expandable shoe and drum type friction devices, the fluid pressure required to overcome the inherent resistances of the shoe and drum type friction devices will be predeterminately greater than that required for the disc type friction devices so that a constant fluid pressure difference, equivalent to that required to take up the inherent resistances thereof, is necessary to establish an equal effective braking force at said axle sets of friction devices.

It is therefore a general object of the present invention to provide a control valve for effecting substantially equal friction device energization between dissimilar types of vehicle axle friction devices.

Another object is to provide a novel control valve for use in a vehicle fluid pressure system having dissimilar sets of axle friction devices which controls the flow of displaced pressure fluid for effecting substantially equal actuation of the dissimilar sets of axle friction devices.

Another object is to provide a novel control valve initially permitting pressure fluid flow to dissimilar axle sets of friction devices which, in response to a fluid pressure sufficient to initially energize one set of said friction devices, interrupts pressure fluid flow thereto and, in response to the attainment of a fluid pressure sufficient to initially energize the other set of said friction devices, maintains a substantially constant fluid pressure difference between said one and other sets of friction devices.

Still another object of the present invention is to provide a control valve for use in a vehicle fluid pressure system to control the energization of disc type friction devices on one vehicle axle and conventional shoe and drum type friction devices on another vehicle axle, said control valve closing pressure fluid flow to said disc type friction devices in response to fluid pressure in the system attaining a value sufficient for initial energization thereof, and upon the fluid pressure in the system attaining a value sufficient for initial energization of said shoe and drum type friction devices, said control valve permits further pressure fluid flow to said disc type friction devices while maintaining the difference between the fluid pressures at said disc type and shoe and drum type friction devices so that the effective braking forces thereat are substantially equal.

Still another object of the present invention is to provide a novel control valve which permits bleeding of the hydraulic system at low fluid pressures.

Still another object of the present invention is to provide a novel control valve of simplified construction and economy of manufacture.

These and other objects and advantages will become apparent hereinafter.

Briefly, the present invention comprises a control valve for a vehicle having a housing with a pair of ports therein, control means movable in said housing in response to a predetermined applied fluid pressure to interrupt pressure fluid communication between said ports, and other control means being thereafter movable in response to fluid pressure above a second predetermined value to maintain a predetermined difference between the fluid pressures at said ports.

Figure 2:
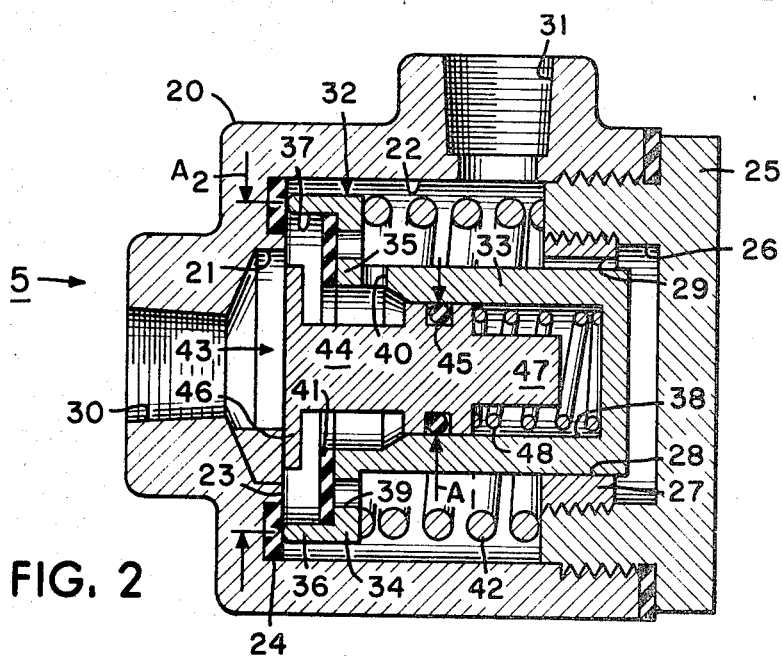
Figure 3:
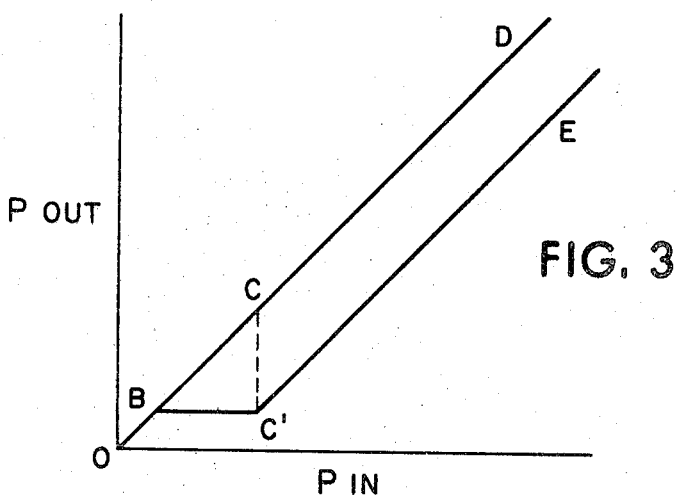

In the drawings which illustrate embodiments of the present invention,

FIG. 1 is a diagrammatic view of a fluid pressure system having a control valve therein embodying the present invention, FIG. 2 is a sectional view showing the control valve of FIG. 1 in cross-section, and FIG. 3 is a graphical representation of the brake pressure in the fluid pressure system of FIG. 1 as effected by the control valve therein.

Referring to the drawings in detail and in particular to FIG. 1, a fluid pressure system 1 is provided with a brake pedal 2 operably connected to a fluid pressure generating means or master cylinder 3, and a delivery conduit 4 connects the master cylinder 3 with the inlet port of a pressure inhibiting or control valve 5. A conduit 6 has one end intersecting conduit 4 while the other end thereof branches at 7, 8 for connection with servo motors or wheel cylinders 9, 10 of the rear wheel brake assemblies 11, 12. Another conduit 13 has one end connected with the outlet port of the control valve 5 and the other end thereof branches at 14, 15 for connection with servo motors or wheel cylinders 16, 17 of the front wheel brake assemblies 18, 19.

Referring to FIG. 2, the control valve 5 is provided with a housing 20 having axially aligned inlet and outlet chambers 21, 22 therein, and an abutment or shoulder 23 is provided at the intersection of said inlet and outlet chambers. An annular seal 24 is provided in the outlet chamber 22 adajacent to the shoulder 23 forming a valve seat in circumscribing relation to the inlet chamber 21. The leftward end of the inlet chamber 21 is closed by the housing 20, and the rightward end of the outlet chamber 22 is closed by a plug member 25 threadedly received therein. The plug member 25 has an axially extending recess 26 therein substantially coaxial with the outlet chamber 22, and an insert 27 having a central opening 28 and a plurality of axially extending passages 29 therein is threadedly received in the leftward end of the recess 26. An inlet port 30 which receives the conduit 4, as previously mentioned, is provided in the housing 20 connecting with the leftward end of the inlet chamber 21, and an outlet port 31 which receives the conduit 13, as previously mentioned, is also provided in the housing 20 connecting with the outlet chamber 22 adjacent the rightward end thereof.

A flow control or piston member, indicated generally at 32, is provided with a body portion 33 having a head portion 34 on the leftward end thereof, and the rightward end of said body portion is slidably received in the insert bore 28. The head portion 34 is formed with a radially extending flange portion 35 connected to the leftward end of the body portion 33 and an axially extending sealing portion 36 adjacent the outer periphery of said flange portion. A blind counterbore and stepped bore 37, 38 are provided in the leftward end of the flow control member 32, with the counterbore 37 being provided in the head portion 34 and the bore 38 being provided in the body portion 33. A plurality of relief or flow passages 39 are provided through the flange portion 35, and another passage 40 is provided through the body portion 33 adjacent to said flange portion connecting the bore 38 with the outlet chamber 22. An annular seal or flapper valve 41 is provided in the counterbore 37 adjacent to the flange portion 35 in circumscribing relation to the bore 38 for controlling the flow of pressure fluid through the relief passages 39 and said seal is normally in a position interrupting pressure fluid flow therethrough. A pre-loaded spring 42 is provided in the outlet chamber 22 and is biased between the plug member 25 and the flange portion 35 normally urging the sealing portion 36 into sealing engagement with the valve seat 24 on the housing shoulder 23.

Another flow control or piston member, indicated generally at 43, is provided with a body portion 44 having a peripheral seal 45 thereon which sealably engages the bore 38 in the body portion 33. A head portion or valve member 46 is provided on the leftward end of the flow control member 43 and is sealingly engageable with the seal member 41 about the bore 38. An extension 47 is provided on the rightward end of the flow control member 43, and a return spring 48 is concentrically aligned with said extension and biased between the rightward end of the flow control member 32 and the rightward end of the flow control member 43 normally urging the head portion 46 to a position engaging the shoulder 23 and disengaged from the seal 41. To complete the description of the control valve 5, it should be noted that an effective fluid pressure responsive area $A_1$ is provided on the flow control member 43 across the seal 45 and that another effective fluid pressure responsive area $A_2$ is defined by the flow control member 32 across the sealing portion 36. It should also be noted that a flow passage connecting the inlet and outlet chambers 21, 22 is formed by the counterbore and bore 37, 38 and passage 40 in the flow control member 32 and flow through said passage is controlled by the head portion 46 engaging the valve member 41 and a by-pass or shunt passage connecting said inlet and outlet chambers is controlled by the sealing portion 36 engaging the valve seat 24. Since the flow control member 32 in its normal position permits pressure fluid flow through the passage 40 and through the control valve 5 at low fluid pressures, it is possible to bleed the fluid pressure system 1 with the control valve 5 therein.

In the operation with the component parts of the control valve 5 in their normal positions, as shown in FIG. 2 and as described hereinbefore, a manually applied force on the brake pedal 2 displaces pressure fluid from the master cylinder 3 through the conduits 4, 6, 7 and 8 into the wheel cylinders 9, 10 to intially energize the rear wheel brake assemblies 11, 12. The displaced pressure fluid also flows from the conduit 4 through the inlet port 30 of the control valve 5 into the inlet chamber 21 and therefrom past the valve head 46 and seal member 41 through the counterbore and bore 37, 38 in the flow control member 32, the passage 40 and into the outlet chamber 22. The displaced pressure fluid flows from the outlet chamber 22 through the outlet port 31 and conduits 13, 14 and 15 into wheel cylinders 16, 17 to initially energize the front wheel brake assemblies 18, 19. Since it is assumed that the rear brake assemblies 11, 12 have greater inherent resistances than those of the front wheel brake assemblies 18, 19 due to the design thereof, it follows that said front wheel brake assemblies will be initially energized in response to a fluid pressure which is predeterminately less or smaller than that required to effect initial energization of said rear wheel brake assemblies.

During the initial energization of the front and rear brake assemblies 18, 19 and 11, 12, the fluid pressure of the displaced pressure fluid at the inlet and outlet ports 30, 31 of the control valve 5 is substantially equal. Fluid pressure at the outlet port 31 acts on the area $A_1$ of the flow control member 43 to establish a force $F_1$ urging said flow control member rightwardly in opposition to the force of the spring 48. When the fluid pressure at the outlet port 31 attains a predetermined value B, the force $F_1$ overcomes the force of the spring 48, and the valve head 46 sealably engages the valve member 41 to interrupt pressure fluid communication through the control valve 5. Further increases in the input fluid pressure $Pi$ act on the valve head 46 to maintain it in sealing engagement with the valve member 41 and on said valve member to maintain it in sealing engagement with the flange portion 35 to prevent pressure fluid flow through the relief passages 39. The input fluid pressure $Pi$ acts on the effective area $A_2$ to create a force $F_2$ urging the flow control member 32 rightwardly. Since the output fluid pressure $Po$ is free to flow into the plug member recess 26 through the passages 28, the output fluid pressure $Po$ is also effective on the fluid pressure area $A_2$ of the flow control member 32 to establish a force $F_3$ thereon urging said flow control member leftwardly in opposition to the force $F_2$. When the input fluid pressure $Pi$ is increased to a value C predetermined greater than the predetermined value B of the output fluid pressure $Po$, the increased force $F_2$ is sufficient to overcome the opposing force $F_3$ plus the force $Fc$ of the spring 42 and open the by-pass or shunt passage controlled by the sealing portion 36. Since the opposing forces $F_2$ and $F_3$ are established by the input and output fluid pressures $Pi$ and $Po$ respectively acting on the effective area $A_2$, a predetermined fluid pressure differential will be maintained on opposite sides of the flow control member 32 due to the relatively constant force $Fc$ of spring 42 acting thereon. It is therefore apparent that as further increases in the input fluid pressure $Pi$ occur, the control member 32 will move rightwardly opening the by-pass or shunt passage to permit a sufficient increase in the output fluid pressure $Po$ to maintain a constant fluid pressure difference between the input and output fluid pressures $Pi$, $Po$.

When the desired braking application is attained, the manually applied force is removed from the brake pedal 2 to permit the return flow of displaced pressure fluid to the master cylinder 3 through the conduits 4, 6, 7 and 8 from the wheel cylinders 9, 10 to effect de-energization of the rear wheel brake assemblies 11, 12. This also serves to exhaust or eliminate the input fluid pressure $Pi$ at the control valve 5 and in the input chamber 21 which eliminates the force $F_2$ acting on the control valve 32. The elimination of fluid pressure in the input chamber 21 also eliminates the fluid pressure force on the seal 41 so that the output fluid pressure $Po$ acting on said seal serves to urge it away from relief passages 39 to permit the return flow of pressure fluid through said relief passages. When the input fluid pressure attains the predetermined valve B, the force of the spring 48 returns the control member 43 to its original position with the head member 46 disengaged from the valve member 41 and engaged with the shoulder 23 to establish pressure fluid flow through the passage 40 between the inlet and outlet ports 30, 31. With the flow control member 43 in its original position, the return flow of displaced fluid pressure is effected to de-energize the front wheel brake assemblies 18, 19 from the wheel cylinders 16, 17 thereof through the conduits 14, 15 and 13 to the outlet port 31 of the control valve 5 and therefrom through the outlet chamber 22, the passage 40 and the bore and counterbore 38, 37 in the flow control member 32, and therefrom past the valve head 46 and seal 41 into the inlet chamber 21. Also, the return pressure fluid flows from the outlet chamber 22 through the relief passages 39 into the inlet chamber 21. The return flow of displaced pressure fluid flows from the inlet chamber 21 through the inlet port 30, and the conduit 4 into the master cylinder 3 to de-energize the front brake assemblies 18, 19 substantially simultaneous with the de-energization of the rear brake assemblies 11, 12.

As illustrated by the graphical representation of the braking pressure of FIG. 3, until the displaced pressure fluid attains the value B, the output fluid pressure Po from the control valve 5 to the front brake assemblies 18, 19 is in direct proportion, i.e., a 1:1 ratio, with the input fluid pressure Pi to the rear brake assemblies 11, 12, as shown by the line OB. This predetermined fluid pressure B is equivalent to the fluid pressure required to overcome the inherent resistances of the front brakes 18, 19 and to effect initial energization thereof. When this predetermined fluid pressure B is attained, the flow control member 43 has moved rightwardly to sealably engage the valve head 46 with the seal 41 to interrupt pressure fluid communication between the inlet and outlet ports 30, 31 through the flow passage 40 and thereby interrupts pressure fluid communication between the front and rear brake assemblies 18, 19 and 11, 12. The output fluid pressure Po to the front brakes 18, 19 remains substantially constant, as shown by the line BC', while the input fluid pressure Pi to the rear brakes 11, 12 is increased, as shown by the line BC. When the input fluid pressure Pi attains the value C, which is equivalent to the fluid pressure required to overcome the inherent resistances of the rear brakes 11, 12, the force $F_2$ is sufficient to overcome the force $F_3$ plus the spring force Fc and thereafter the control member 32 effects its incremental by-passing operation, as previously described, to maintain the predetermined fluid pressure difference between the input and output fluid pressures Pi, Po. In other words, as the input fluid pressure Pi is increased, as shown by the line CD, a predetermined increase results in the output fluid pressure Po, as shown by the line C'E, and the difference between the input and output fluid pressures Pi, Po is maintained substantially equal to the constant forces Fc of the spring 42.

From the foregoing, it is now apparent that a novel control valve meeting the objects and advantages set out hereinbefore, as well as other objects and advantages apparent in the disclosure, is provided and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing having inlet and outlet ports therein, a flow passage in said housing between said inlet and outlet ports, resiliently urged means movable in said housing for controlling pressure fluid communication through said flow passage between said inlet and outlet ports, passage means in said resiliently urged means between said inlet and outlet ports, a bore in said resiliently urged means intersecting with said passage means, other means movable in said bore for controlling pressure fluid communication through said passage means between said inlet and outlet ports, spring means in said bore normally urging said other means toward an open position establishing pressure fluid communication through said passage means between said inlet and outlet ports, said other means being movable in said bore against said spring means in response to a predetermined value of the fluid pressures at said inlet and outlet ports toward a position closing said passage means and isolating the fluid pressures at said inlet and outlet ports, and said resiliently urged means being thereafter movable in response to increases in the fluid pressure at said inlet port in excess of another predetermined value predeterminately greater than the first named predetermined value toward a metering position in said flow passage to establish metered pressure fluid communication therethrough between said inlet and outlet ports and effect a metered increase in the fluid pressure at said outlet port in a predetermined ratio with the increased fluid pressure at said inlet port in excess of the other predetermined value, a valve seat on said housing about said flow passage, and valve means on said resiliently urged means and normally urged into engagement with said valve seat to close said flow passage and interrupt pressure fluid communication threrethrough between said inlet and outlet ports, said valve means being disengaged from said valve seat to establish the metered pressure fluid communication between said inlet and outlet ports upon the movement of said resiliently urged means to its metering position.

2. A control valve comprising a housing having inlet and outlet ports therein, a flow passage in said housing between said inlet and outlet ports, resiliently urged means movable in said housing for controlling pressure fluid communication through said flow passage between said inlet and outlet ports, passage means in said resiliently urged means between said inlet and outlet ports, a bore in said resiliently urged means intersecting with said passage means, other means movable in said bore for controlling pressure fluid communication through said passage means between said inlet and outlet ports, spring means in said bore normally urging said other means toward an open position establishing pressure fluid communication through said passage means between said inlet and outlet ports, said other means being movable in said bore against said spring means in response to a predetermined value of the fluid pressures at said inlet and outlet ports toward a position closing said passage means and isolating the fluid pressures at said inlet and outlet ports, and said resiliently urged means being thereafter movable in response to increases in the fluid pressure at said inlet port in excess of another predetermined value predeterminately greater than the first named predetermined value toward a metering position in said flow passage to establish metered pressure fluid communication therethrough between said inlet and outlet ports and effect a metered increase in the fluid pressure at said outlet port in a predetermined ratio with the increased fluid pressure at said inlet port in excess of the other predetermined value, other passage means in said resiliently urged means between said inlet and outlet ports for the return flow of pressure fluid from said outlet port to said inlet port, and valve means on said resiliently urged for controlling said other passage means, said valve means being movable toward a position establishing the return flow of pressure fluid through said other passage means from said outlet port to said inlet port when the magnitude of the fluid pressure at said inlet port is reduced below that of the fluid pressure at said outlet port.

3. A control valve according to claim 1, comprising another valve seat on said resiliently urged means about said passage means, said other valve seat being engaged by said other means upon the movement thereof to its closed position.

4. A control valve according to claim 3, wherein said other means includes other valve means for engagement with said other valve seat, said other valve means being moved into engagement with said other valve seat upon the movement of said other means to its closed position and being normally disengaged from said other valve seat when said other means is in its open position.

5. A control valve according to claim 4, wherein said other means includes a piston slidable in said bore, said spring means having opposed ends biased between said resiliently urged means and said piston, and extension means on said piston extending through said other valve seat and having an end portion thereon in a portion of said flow passage, said other valve means being defined on said end portion.

6. A control valve comprising a housing having inlet and outlet ports therein, a valve seat on said housing about said inlet port, piston means movable in said housing between said inlet and outlet ports, said piston means having an end portion adjacent to said inlet port, annular valve means on said end portion for engagement with said valve seat, spring means engaged between said housing and said piston means normally urging said valve means into engagement with said valve seat, a pair of stepped bores in said piston means, one of said stepped bores intersecting with said end portion radially inwardly of said valve means and normally being connected in pressure fluid communication with said inlet port, passage means in said piston means having one end intersecting with said one stepped bore and the other end thereof connected in pressure fluid communication with said outlet port, another valve seat on said end portion about said one stepped bore, other piston means slidable in the other of said stepped bores, an extension on said other piston means extending through said other valve seat and having a free end portion thereon exteriorly of said one stepped bore, other valve means on said free end portion for engagement with said other valve seat, other spring means in said other stepped bore engaged between said first named and other piston means and normally urging said other piston means toward a position disengaging said other valve means from said other valve seat to establish open pressure fluid communication between said inlet and outlet ports through said one stepped bore and passage means, said other piston means being movable against said other spring means in response to established fluid pressure at said inlet and outlet ports of a predetermined value to engage said other valve means with said other valve seat and interrupt pressure fluid communication through said one stepped bore and passage means between said inlet and outlet ports, and said first named piston means being thereafter movable against said first named spring means in response to increases in the fluid pressure at said inlet port of another predetermined value predeterminately in excess of the first named predetermined value to disengage said first named valve means from said first named valve seat and establish metered pressure fluid communication between said inlet and outlet ports effecting a metered increase in the fluid pressure at said outlet port in a predetermined ratio with the increased fluid pressure at said inlet port in excess of the other predetermined value, other passage means in said first named piston means between said inlet and outlet ports, and relief valve means on said first named piston means for controlling the return flow of pressure fluid from said outlet port to said inlet port through said other passage means, said relief valve means being movable toward a position establishing the return flow of pressure fluid through said other passage means from said outlet port to said inlet port when the magnitude of the fluid pressure at said inlet port is reduced below that of the fluid pressure at said outlet port.

References Cited

UNITED STATES PATENTS

| | | | |
|---|---|---|---|
| 3,375,852 | 4/1968 | Milster | 303—6 |
| 3,385,637 | 3/1968 | Kersting | 303—6 |
| 2,677,939 | 5/1954 | Clute | 137—512.1X |
| 2,734,525 | 2/1956 | Rausch | 137—517X |
| 3,414,334 | 12/1968 | Payne | 303—6(C) |
| 3,418,024 | 12/1968 | Stelzer | 303—6(C) |

MILTON BUCHLER, Primary Examiner

J. J. McLOUGHLIN, Jr., Assistant Examiner

U.S. Cl. X.R.

60—54.5; 137—110, 493.3